United States Patent
Chang et al.

(10) Patent No.: US 7,796,963 B2
(45) Date of Patent: Sep. 14, 2010

(54) MOBILE STATION ACQUISITION STATE ANTENNA TUNING SYSTEMS AND METHODS

(75) Inventors: Henry Chang, San Diego, CA (US); Jorge Fabrega-Sanchez, San Diego, CA (US); Gregory Poilasne, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 899 days.

(21) Appl. No.: 11/062,214

(22) Filed: Feb. 17, 2005

(65) Prior Publication Data

US 2006/0183442 A1 Aug. 17, 2006

(51) Int. Cl.
*H04B 1/18* (2006.01)
(52) U.S. Cl. .............. 455/193.1; 455/121; 455/575.7; 343/860
(58) Field of Classification Search .............. 455/193.1, 455/248.1, 83, 84, 269, 575.7, 107, 121, 455/129, 231, 280, 289–292, 82; 343/820, 343/822, 850, 852, 860, 913
See application file for complete search history.

(56) References Cited

U.S. PATENT DOCUMENTS

| | | | |
|---|---|---|---|
| 5,103,459 A | 4/1992 | Gilhousen et al. | |
| 5,982,759 A | 11/1999 | Jo et al. | |
| 6,052,566 A | 4/2000 | Abramsky et al. | |
| 6,064,868 A | 5/2000 | Kobayashi | |
| 6,070,075 A | 5/2000 | Kim | |
| 6,144,650 A | 11/2000 | Watanabe et al. | |
| 6,188,906 B1 | 2/2001 | Lim et al. | |
| 6,198,441 B1 | 3/2001 | Okabe et al. | |
| 6,282,422 B1* | 8/2001 | Aikawa et al. | 455/436 |
| 6,298,051 B1 | 10/2001 | Odenwalder et al. | |
| 6,492,942 B1* | 12/2002 | Kezys | 342/368 |
| 6,526,263 B1* | 2/2003 | Saito | 455/78 |
| 6,657,595 B1 | 12/2003 | Phillips et al. | |
| 6,710,651 B2 | 3/2004 | Forrester | |
| 6,714,526 B2 | 3/2004 | Wei et al. | |
| 6,741,861 B2 | 5/2004 | Bender et al. | |
| 6,754,251 B1 | 6/2004 | Sriram et al. | |
| 6,766,169 B2* | 7/2004 | Cooper | 455/435.2 |
| 6,785,249 B2 | 8/2004 | Soliman | |
| 6,788,685 B1 | 9/2004 | Holtzman et al. | |
| 6,862,432 B1* | 3/2005 | Kim | 455/80 |
| 6,993,297 B2* | 1/2006 | Smith, Jr. | 455/82 |
| 7,212,789 B2* | 5/2007 | Kuffner | 455/83 |
| 7,366,169 B1* | 4/2008 | Backes et al. | 370/389 |

(Continued)

FOREIGN PATENT DOCUMENTS

KR    2001-011282    2/2001

*Primary Examiner*—Edward Urban
*Assistant Examiner*—Christian A Hannon

(57) ABSTRACT

Wireless communication device tuning an antenna matching circuit to favor a receive band efficiency over a transmit band efficiency in an acquisition state. Systems and methods are provided that increase the antenna efficiency in the receive band when the wireless communication device is searching for a synchronization message in order to acquire a communication channel. The antenna efficiency may be changed incrementally or may be optimized completely for the receive frequency. The increase in antenna efficiency in the receive band is accomplished by tuning the antenna matching circuit. One way to tune the antenna matching circuit is to apply a voltage to a ferro-electric capacitor in the matching circuit, thereby changing the capacitance of the ferro-electric capacitor, thereby changing the impedance of the matching circuit.

14 Claims, 2 Drawing Sheets

U.S. PATENT DOCUMENTS

2004/0009754 A1 1/2004 Smith, Jr.
2004/0252724 A1 12/2004 Jou
2005/0007291 A1 1/2005 Fabrega-Sanchez et al.

* cited by examiner

MOBILE STATION ACQUISITION STATE ANTENNA TUNING SYSTEMS AND METHODS

RELATED APPLICATIONS

This application relates to the following two U.S. Pat. Appls. filed on the same day, having the same inventors, and assigned to the assignee of the present invention, and which are hereby incorporated herein by reference: U.S. patent application Ser. No. 11/062,242 and U.S. patent application Ser. No. 11/062,239.

BACKGROUND OF THE INVENTION

1. Field of the Invention

The invention relates generally to wireless electronic communications and more particularly to antenna tuning systems and methods.

2. Background

In a communication system with different transmit and receive frequencies, mobile station antenna efficiency is a balance between optimization for the transmit frequency and optimization for the receive frequency. Under typical operating conditions, the typical antenna efficiency balance allows for the best use of the transmit and receive resources. However, commonly, conditions occur in which the typical antenna efficiency balance is not preferred. In such conditions, it can be said that the forward and reverse links are not balanced.

The forward link is the communication link for data (voice data or other data) travelling from a base station transmitter to a mobile station receiver. The reverse link is the communication link for data (voice data or other data) from the mobile station transmitter to the base station receiver.

When a mobile station is in an acquisition state, the mobile station does not transmit any signal. Acquisition state means that the mobile station is attempting to acquire a channel, that is, the mobile station is attempting to find a pilot channel or a synchronization (SYNC) channel of a base station. This is commonly referred to as scanning for a channel.

A mobile station in acquisition state typically uses a preferred roaming list (PRL) to control the scanning. The PRL is a prioritized list of channels that the mobile station scans when looking for a pilot channel of a base station. A PRL is stored in the memory of the wireless communication device. The PRL contains records of all of the wireless communication systems or networks that the wireless communication device can communicate with. Several examples of using PRL's are described in U.S. Pat. No. 5,995,829, issued Nov. 30, 1999; U.S. Pat. No. 6,415,148 B1, issued Jul. 2, 2002; U.S. Pat. No. 6,466,802 B1 issued Oct. 15, 2002; U.S. patent application No. 2003/0134637 A1 published Jul. 17, 2003; U.S. patent application No. 2004/0110503, published Jun. 10, 2004; and U.S. patent application No. 2004/0121781 A1, published Jun. 24, 2004, which are each hereby incorporated in whole herein by reference.

SUMMARY OF THE INVENTION

When scanning for a channel (that is, in the acquisition state), a mobile station is only receiving, and is not transmitting any signal. It is advantageous to tune an antenna matching circuit for optimum antenna efficiency in the receive frequency band. The antenna efficiency may be shifted a small amount or a large amount toward the receive frequency band. The antenna efficiency may even be optimized completely for the receive frequency band.

The antenna efficiency balance is tuned by tuning the antenna matching circuit. One way to tune the antenna matching circuit is to apply a voltage to a ferro-electric capacitor in the matching circuit, thereby changing the capacitance of the ferro-electric capacitor, thereby changing the impedance of the antenna system (antenna and matching circuit).

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION

Figure 1:
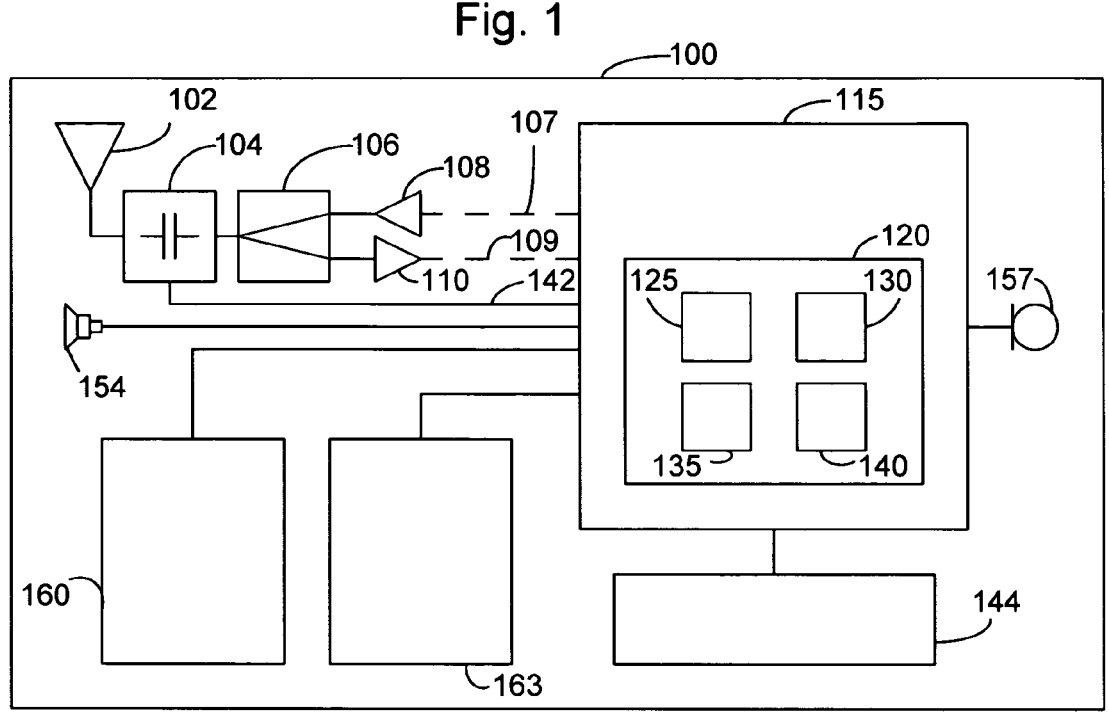
FIG. 1 is a block diagram illustrating a wireless communication device tuning an antenna match in an acquisition state.

FIG. 1 is a block diagram illustrating a wireless communication device tuning an antenna match in an acquisition state. Wireless communication device 100 may be a cellular telephone for communicating with a base station, such as, for example, a code division multiple access (CDMA) mobile station. However, wireless communication device 100 may be any wireless communication device that enters an acquisition state and communicates in at least two frequency bands, for example, a frequency division duplex (FDD) system where Tx and Rx signals don't share the same frequency band, for example in a CDMA system.

Wireless communication device 100 includes antenna 102 for radiating electromagnetic signals into the air and for receiving electromagnetic signals from the air. Only one antenna 102 is shown, though multiple antennas are possible. Antenna 102 is connected to tunable matching circuit 104. Tunable matching circuit 104 may be a ferro-electric tunable matching circuit as described in any of co-pending U.S. patent application Ser. Nos. 10/899,218; 10/899,278; 10/899,285; each filed Jul. 26, 2004; and Ser. No. 10/806,763, filed Mar. 22, 2004, which are each hereby incorporated by reference. Alternatively, tunable antenna matching circuit may be tunable by means of a varactor diode, micro-electrical mechanical switches or other switches switching various reactive components in and out of matching circuit 104 or switching complete matching circuits in and out of the signal path, or by any other convenient means of tuning matching circuit 104.

Matching circuit 104 is connected to duplexer 106. Duplexer 106 duplexes transmit and receive signals. Alternatively, duplexer 106 could be a switch for duplexing transmit and receive signals. Duplexer 106 is connected to transmit path 107, represented by power amplifier (PA) 108. Duplexer 106 is also connected to receive path 109, represented by low noise amplifier (LNA) 110. Transmit path 107 and receive path 109 are connected to processor 115. Processor 115 may be a Qualcomm™ mobile station modem (MSM), such as a commercially available Qualcomm™ 6000 series MSM, for CDMA communications.

Processor 115 includes controller 120. Processor 115 demodulates the received signal on receive path 109. User interface devices, such as speaker 154, microphone 157, display 160 and keypad 163 are also connected to processor 115. In one embodiment, the mobile station 100 communicates in an IS-2000 cellular communication system. See TIA/EIA/IS-2000, New York, N.Y., USA.

Controller 120 may include one or more of optimum receive (Rx) table 135, and transmit/receive (Tx/Rx) table 140. Controller 120 uses Tables 135 and 140 to control antenna matching circuit 104. An example optimum Rx table 135 is shown below as Table 1. An example Tx/Rx table 140 is shown below as Table 2.

The values in Table 1 may be optimally determined by experiment, and other rows may be added to Table 1 as a result of experimental determinations. In Table 1, only two receive channels are shown for illustration. In practice many more channels may be be stored. Further, the channel designations shown in Table 1 may not be actual receive channels. Instead, the channel designations may refer to groups of channels. For example, the lowest 200 channels may be designated as channel (or group) 1 in Table 1. The second group of 200 channels may be designated as channel (or group) 2 in Table 1. Thus, the lowest 200 channels may have the same matching circuit setting, for any given temperature.

Processor 115 is connected to matching circuit 104 by control line 142. Control line 142 supplies a control voltage to matching circuit 104, such as, for example, 0.12 Volts in the above example. A separate voltage source (not shown) may be provided for supplying the control voltage to matching circuit 104. Or, as shown, the control voltage is supplied by processor 115 directly, responsive to the output of Table 1 or 2, as determined by controller 120. Some commercially available processors, such as the above-referenced Qualcomm™ 6000 series MSM, available control voltages on general purpose input/output (GPIO) lines. The maximum voltage available on these lines is about 2.6 volts. Thus, it may be advantageous to limit the matching circuit control voltages to a maximum of 2.6 volts, to avoid using additional voltage sources. Multiple control lines may be used to control multiple matching circuits or multiple matching circuit components, such as multiple FE capacitors, depending on the matching circuit topology.

Controller 120 is shown internal to processor 115. In practice, controller may be external or partially external to processor 115. A separate controller may be provided. For example, a controller may be a separate integrated circuit or may include one or more discrete components. In that case, processor 115 might provide channel or group designations to controller externally.

Processor 115 is connected to memory 144. Tables 1-2 are shown internal to controller 120, which is shown internal to processor 115. Tables 1-2 may be stored in memory 144. Tables 1-2 are shown internal to controller 120 for illustration, since controller uses Tables 1-2 to look up matching circuit settings.

TABLE 1

| Channel or Group | Temperature (° C.) | Matching Circuit Setting (Volts) |
|---|---|---|
| 1 | <0 | 2.52 |
| 1 | 0 to 35 | 2.26 |
| 1 | 35 to 60 | 2.12 |
| 1 | >60 | 2.0 |
| 2 | <0 | 2.60 |
| 2 | 0 to 35 | 2.44 |

TABLE 1-continued

| Channel or Group | Temperature (° C.) | Matching Circuit Setting (Volts) |
|---|---|---|
| 2 | 35 to 60 | 2.30 |
| 2 | >60 | 2.18 |

Another table, such as Table 2, stores matching circuit settings for moving stepwise toward better transmit matching or stepwise toward better receive matching. Either stepwise movement or optimum Rx settings can be used. An example Table 2 is shown below. As is the case for Table 1, experiment will give optimum values for Table 2.

TABLE 2

| Bin Number | Matching Circuit Setting (Volts) |
|---|---|
| 1 | 0.0 |
| 2 | 0.13 |
| 3 | 0.26 |
| 4 | 0.38 |
| 5 | 0.50 |
| 6 | 0.62 |
| 7 | 0.73 |
| 8 | 0.83 |

Table 2 does not include temperature as a parameter. Temperature may be included, increasing the complexity and accuracy of Table 2. Further, only eight bins are shown in Table 2. In practice, many more bins are recommended.

Figure 2:
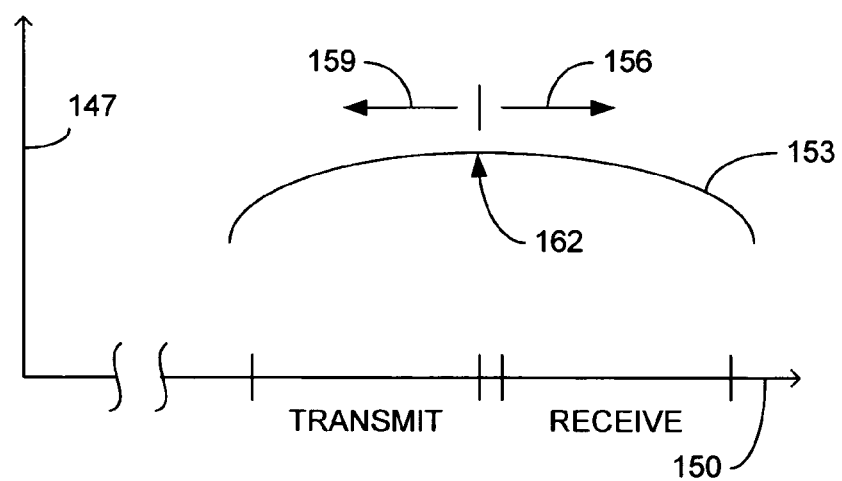
FIG. 2 is a plot illustrating a tunable antenna efficiency.

As described above, controller 120 determines a matching circuit setting for matching circuit 104. FIG. 2 is a plot illustrating a tunable antenna efficiency which can be tuned responsive to the determined matching circuit setting. Antenna efficiency 147 is plotted against frequency 150. An example antenna efficiency 153 is shown as curve 153. Antenna efficiency 153 can be tuned by tuning matching circuit 104. As matching circuit 104 is tuned, curve 153 can be moved to higher or lower frequencies, as shown by arrows 156 and 159. As described in the above referenced copending U.S. patent application Ser. Nos. 10/899,278 and 10/899,218, curve 153 may be tuned to provide maximum efficiency for the currently used receive channel. Further, curve 153 is tuned responsive to commands from controller 120, based on Tables 1-2.

For example, if controller (or processor) calls for an optimum Rx setting, controller retrieves the optimum Rx setting from Table 1, and tunes curve 153, so that peak 162 is positioned at the frequency corresponding to the current Rx channel or group of channels and the current temperature. Advantageously, the antenna efficiency is improved in the current Rx channel when improved Rx efficiency is necessary, that is, when the wireless communication device is in an acquisition state. In such a case, the Tx antenna efficiency may be degraded, but this occurs at a time when Tx antenna efficiency is not needed. Thus, the forward link is optimized when needed and system resources are more optimally utilized.

As described above with respect to Table 2, if a stepwise shift in matching circuit setting is called for, then a matching circuit setting will be selected from Table 2. Controller 120 keeps track of which bin the matching circuit setting is currently in. Then, when a stepwise shift in matching circuit setting is called for, controller 120 looks up the new matching circuit setting in Table 2, based on the current bin. For example, if the current matching circuit setting is 0.13 Volts, that is, bin number 2, and controller or processor calls for a stepwise shift in matching circuit setting to improve the Rx efficiency, then controller 120 will look up the next bin, bin 3, and find the matching circuit setting corresponding to bin 3, which, in this case, is 0.26 Volts. Controller 120 will tune matching circuit 104 by applying 0.26 Volts to matching circuit 104, thereby moving curve 153 one bin toward the Rx frequency band.

Figure 3:
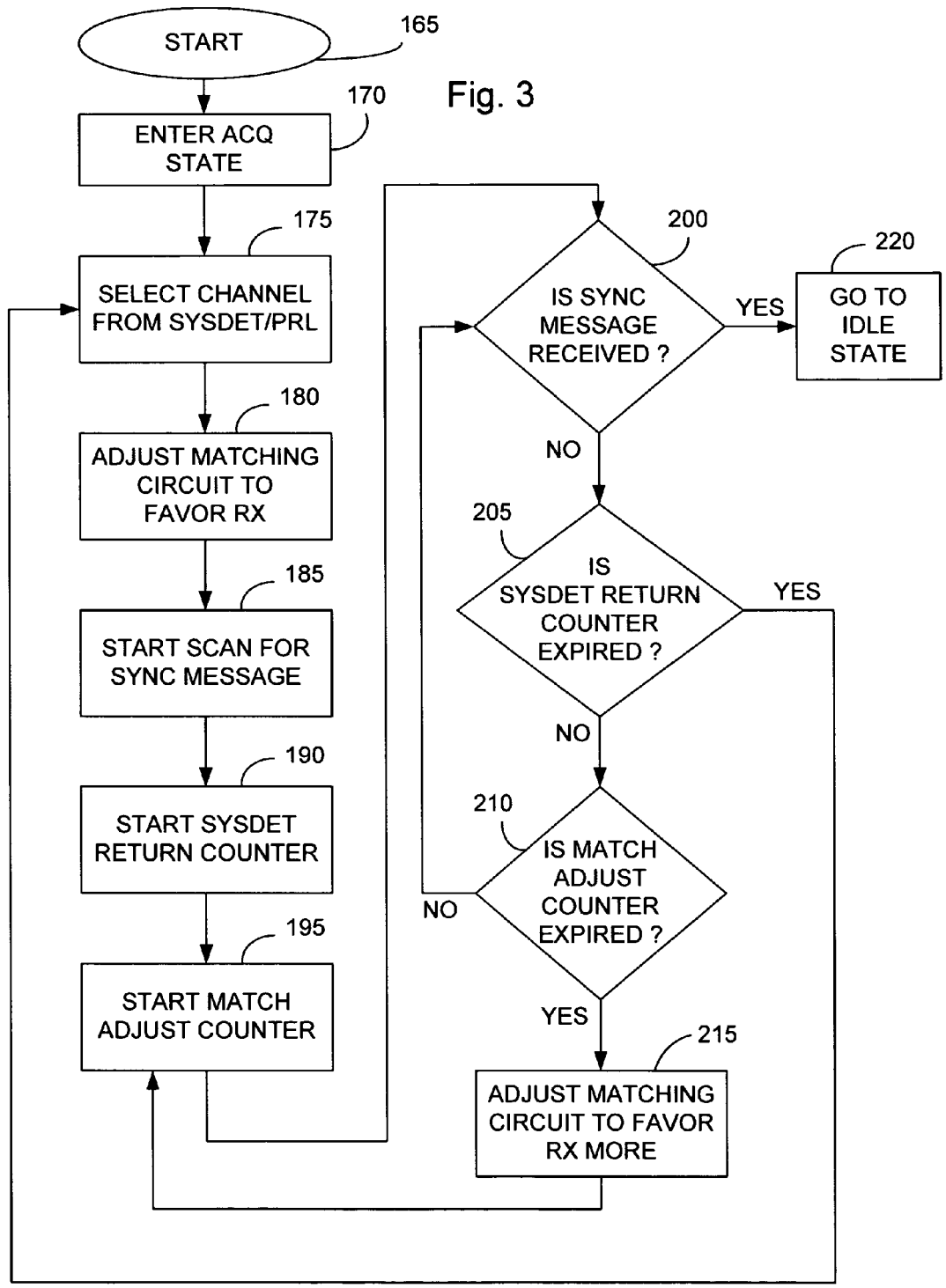
FIG. 3 is a flow chart illustrating a method for tuning an antenna efficiency in an acquisition state.

FIG. 3 is a flow chart illustrating a method for tuning an antenna efficiency (such as curve 153 in FIG. 2) in an acquisition state. The method of FIG. 3 is one method for implementing acquisition state antenna tuning as described herein. It will be understood that variations are possible.

The method starts in step 165. In step 170, the mobile station enters an acquisition (ACQ) state. In step 175, the mobile station selects a communication channel to be searched, typically from a system determination algorithm involving a preferred roaming list. In step 180, the matching circuit is adjusted to favor the receive band of the selected communication channel. The adjusting of step 180 may include adjusting the matching circuit based on Table 1 or Table 2, above. If an optimum Rx setting is chosen in step 180, such as based on Table 1, then the method may end after 180 (end not shown). Alternatively, the method may continue whether step 180 is based on Table 1 or 2.

In step 185, the mobile station starts scanning for a SYNC channel message or a pilot channel. Systems and methods for scanning for a SYNC channel message are described in U.S. Pat. No. 5,103,459, issued Apr. 07, 1992; U.S. Pat. No. 6,714,526 B2, issued Mar. 30, 2004; and U.S. Pat. No. 6,754,251, issued Jun. 22, 2004, which are hereby incorporated by reference. In step 190, a system determination (SYSDET) return counter is started. SYSDET return counter is used to indicate when the mobile station should return to a SYSDET software module to identify the next communication channel to be searched for, commonly based on a PRL. SYSDET return counter may be timer T21m, as identified in the above-referenced TIA/EIA/IS-2000. SYSDET return counter may be one second, but in any case, SYSDET return counter period is determined by the requirements of the wireless communication system.

In step 195, a match adjust counter is started. Match adjust counter is set to indicate when the antenna matching circuit should be adjusted if the SYNC channel message has not been found. Ideally, match adjust counter period is significantly shorter than SYSDET return counter and significantly longer than the cycle period of SYNC channel message. SYNC channel message cycle period may be 0.0267 second. See TIA/EIA/IS-2000. Match adjust counter may be one sixth of SYSDET return counter, that is, about 0.167 second, if SYSDET return counter is one second.

In decision step 200, the mobile station checks whether the SYNC channel message has been found. If SYNC channel message has been found, then the mobile station goes into idle state, as shown in step 220.

If SYNC channel message has not been found, then the method continues to step 205, in which the mobile station checks whether SYSDET return counter has expired. If SYSDET return counter has expired, then the method returns to step 175. If SYSDET return counter has not expired, then the method continues to decision step 210, in which the mobile station determines whether match adjust counter has expired.

If match adjust counter has not expired, then the method returns to decision step 200. If match adjust counter has expired, then the method continues to step 215, in which antenna matching circuit is adjusted to favor the Rx band more. After step 215, the method returns to step 195. By repeated cycles from step 195 to step 200 to step 205 to step 210 to step 215 and back to step 195, mobile station can scan all matching circuit bins (such as in Table 2) for the best matching circuit setting for optimum receive performance.

The shifting of antenna efficiency of steps 180 and 215 can be accomplished by any convenient means, such as, for example, by employing a table like Tables 1 or 2. Alternatively, Table 2 may be avoided if, for example, the matching circuit settings are all equally spaced. Then, the shift step 215 may be accomplished without Table 2, merely by changing the matching circuit setting by a predetermined amount in the Rx direction. For example, responsive to step 180 or 215, 0.1 Volt may be added to the current matching circuit setting.

The method shown with respect to FIG. 3 can be modified many ways. For example, the steps can be taken in different orders, or some steps can be left out. While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for tuning a wireless communication device antenna matching circuit, the method comprising the steps of:
  (a) selecting a first communication channel;
  (b) searching for a synchronization message;
  (c) adjusting an impedance match of the antenna matching circuit;
  (d) repeating steps (b) and (c) until the synchronization message is found;
  (e) starting a system determination return counter;
  (f) identifying an expiration of the system determination return counter;
  (g) selecting a second channel, responsive to step (f);
  (h) retrieving an item from a preferred roaming list, and wherein steps (a) and (g) are responsive to step (h);
  (i) adjusting the antenna matching circuit to favor a receive band efficiency over a transmit band efficiency, wherein the adjusting involves degrading the transmit band efficiency in an acquisition state; and
  (j) performing step (i) before step (b) in addition to performing step (i) in step (c), wherein the adjusting in step (i), when performed in step (c) further involves adjusting the antenna matching circuit incrementally over a previous setting to further favor the receive band efficiency.

2. The method of claim 1, further comprising the step of:
  (k) determining that the synchronization message was not found, and wherein step (c) is responsive to step (k).

3. A method for tuning a wireless communication device antenna matching circuit, the method comprising the steps of:
  (a) selecting a first communication channel;
  (b) searching for a synchronization message;
  (c) adjusting an impedance match of the antenna matching circuit;
  (d) repeating steps (b) and (c) until the synchronization message is found, wherein step (b) continues for a time period that is longer than a synchronization message cycle period and shorter than a system determination return period;
  (e) starting a system determination return counter;
  (f) identifying an expiration of the system determination return counter;
  (g) selecting a second channel, responsive to step (f);
  (h) retrieving an item from a preferred roaming list, and wherein steps (a) and (g) are responsive to step (h)
  (i) ladjusting the antenna matching circuit to favor a receive band efficiency over a transmit band efficiency, wherein the adjusting involves degrading the transmit band efficiency in an acquisition state; and (j) performing step (i) before step (b) in addition to performing step (i) in step (c), wherein the adjusting in step (i), when performed in step (c) further involves adjusting the antenna matching circuit incrementally over a previous setting to further favor the receive band efficiency.

4. The method of claim 3, wherein step (b) continues for at least one sixth of the system determination return period.

5. The method of claim 3, wherein the synchronization message cycle period is about 0.0267 second.

6. The method of claim 5, wherein the system determination return period is about one second.

7. The method of claim 3, wherein the system determination return period is about one second.

8. A wireless communication device comprising:
an antenna;
a tunable antenna matching circuit connected to the antenna;
a matching circuit controller connected to the tunable antenna matching circuit and configured to shift the tunable antenna matching circuit to favor a receive band efficiency over a transmit band efficiency, where the transmit band efficiency is degraded in an acquisition state, before the wireless communication device searches for a synchronization message when the wireless communication device is in an acquisition state, where the matching circuit controller is further configured to incrementally adjust the tunable antenna matching circuit to further favor the receive band efficiency if the synchronization message is not found;
means for scanning for the synchronization message for a time period that is longer than a synchronization message cycle period and shorter than a system determination return period;
a base band processor either comprising the controller or connected to the controller, the base band processor configured to access a preferred roaming list and determine a communication channel, the communication channel having a transmit band and a receive band, and wherein shifting the tunable antenna matching circuit to favor a receive efficiency over a transmit efficiency comprises tuning the antenna matching circuit to improve the antenna efficiency in the receive band; and
a memory storing a table, the table comprising channel indicia or channel group indicia and corresponding tunable antenna matching circuit settings, and wherein the processor is configured to look up the channel indicia or channel group indicia in the table and tune the antenna matching circuit to the corresponding tunable antenna matching circuit settings.

9. The wireless communication device of claim 8, further comprising:
a voltage source connected to the base band processor or in the base band processor; and
wherein the tunable antenna matching circuit comprises:
a ferro-electric tunable capacitor having a ferro-electric material with a tunable dielectric constant, wherein the voltage source is configured to tune the dielectric constant responsive to a control signal from the base band processor.

10. The wireless communication device of claim 8, wherein the tunable antenna matching circuit is a tunable impedance matching circuit.

11. The wireless communication device of claim 8, wherein the time period is at least one sixth of the system determination return period.

12. The wireless communication device of claim 8, wherein the synchronization message cycle period is about 0.0267 second.

13. The wireless communication device of claim 12, wherein the system determination return period is about one second.

14. The wireless communication device of claim 8, wherein the system determination return period is about one second.

* * * * *